United States Patent [19]

Busch-Sørensen

[11] Patent Number: 5,085,772
[45] Date of Patent: Feb. 4, 1992

[54] FILTER FOR FILTRATION OF FLUIDS

[75] Inventor: Thomas Busch-Sørensen, Holte, Denmark

[73] Assignee: Eskofot A/S, Ballerup, Denmark

[21] Appl. No.: 582,098

[22] Filed: Sep. 14, 1990

[30] Foreign Application Priority Data

Sep. 15, 1989 [DK] Denmark .................. 4571/89

[51] Int. Cl.⁵ .................................. B01D 33/03
[52] U.S. Cl. ........................... 210/388; 210/748; 210/384; 210/321.75; 210/321.84; 210/785
[58] Field of Search .............. 210/388, 384, 323.1, 210/324, 321.75, 321.84, 785, 748, 321.67, 407, 483, 488, 785

[56] References Cited

U.S. PATENT DOCUMENTS

| | | | |
|---|---|---|---|
| 3,305,481 | 2/1967 | Peterson | 210/384 |
| 3,463,321 | 8/1969 | Van Ingen | 210/388 |
| 3,517,811 | 6/1970 | Newfarmer | 210/19 |
| 3,864,249 | 2/1975 | Wallis | 210/389 |
| 4,158,629 | 6/1979 | Sawyer | 210/137 |
| 4,346,011 | 8/1982 | Brownstein | 210/748 |
| 4,666,595 | 5/1987 | Graham | 210/748 |
| 4,759,775 | 7/1988 | Peterson et al. | 210/748 |

FOREIGN PATENT DOCUMENTS 1210942 11/1970 United Kingdom .
1270971 4/1972 United Kingdom .
1592068 7/1981 United Kingdom .

*Primary Examiner*—Stanley S. Silverman
*Assistant Examiner*—Neil M. McCarthy
*Attorney, Agent, or Firm*—Cushman, Darby & Cushman

[57] ABSTRACT

A filter for filtration of fluids includes a filter cloth arranged in a housing with an inlet and an outlet. An acoustic field produced by an acoustic transducer, can act on the filter cloth. The invention the filter cloth is arranged substantially in a pressure node, i.e. a velocity antinode, of the acoustic field. As a result, a relatively inexpensive filter is obtained which is economical to operate due to the long durability of the filter.

3 Claims, 1 Drawing Sheet

FILTER FOR FILTRATION OF FLUIDS

FIELD OF THE INVENTION

The invention relates to a filter for filtration of fluids and comprising a filter cloth arranged in a housing with an inlet and an outlet, where an acoustic field produced by an acoustic means, such as an acoustic transducer, can act on the filter cloth.

BACKGROUND ART

It is known to improve a filtration process by an acoustic field, such as an ultrasound field, acting on a filter cloth in connection with filtration of oil. Such a known filter comprises a cylindrical filter cloth pivotally arranged in a housing. The oil to be filtered is fed into the filtration housing on the outside of the filter cloth, and the filtered oil is drained off from the inner side of the filter cloth. High-powered ultrasonic transducers are arranged along the surface of the cylindrical filter cloth, said transducers cleaning the filter cloth while these cloth is slowly rotating. The known filter is encumbered with the drawback that the filter cloth is quickly worn due to the cavitation from the strong ultrasonic field, and the filter is extremely expensive due to the transducer system and the rotating cylindrical cloth.

SUMMARY OF THE INVENTION

The object of the invention is to provide a filter of the above type, which is inexpensive to manufacture and to operate.

The filter according to the invention is characterized in that the filter cloth is arranged substantially in a pressure node, i.e. a velocity antinode, of the acoustic field.

As a result, a relatively inexpensive filter is obtained which is economical to operate due to the long durability of the filter. The advantages are obtained, in particular, because the filter cloth is arranged in a pressure node, i.e. where a high particle velocity amplitude with a low pressure amplitude applies with the result that a minimum cavitation exists on the surface of the filter cloth.

The acoustic field may, according to the invention, comprise standing waves in an acoustic resonator, whereby the ultrasonic power is utilized to an optimum, the sound field being amplified in the resonator instead of being lost through radiation into a free field. The substantially reduced power demand renders it possible to use an acoustic means in form of a transducer with a piezoelectric disk.

The resonator is of a length of an integral number of half the wave length as seen in the direction of propagation of the acoustic field created by the acoustic means, i.e. the transducer, provided both ends of said resonator are terminated by an approximately perfect reflector, i.e. a thick plate of a material with an acoustic impedance substantially greater than the impedance of the fluid. When the resonator is terminated, for instance, by a thin plastic plate with the result that the sound pressure is reflected in antiphase, the resonator must be of a length of an uneven number times a quarter of the wave length.

The filter may furthermore according to the invention comprise two or more filter cloths arranged in their respective node of the applied field, and the spaces between the filter cloths may alternately communicate with the inlet and outlet side, respectively, of the filter.

In this manner the ultrasonic power is utilized to an optimum, which results in a filter of a high filtration capacity and, in addition, of a relatively compact structure.

Finally according to the invention more, preferably two mutually spaced filter cloths may be arranged in a common node of the acoustic field, and the spaces between the filter cloths may alternately communicate with the inlet and outlet side, respectively, of the filter, whereby a filter is achieved which is very compact relative to its filtration capacity.

BRIEF DESCRIPTION OF THE DRAWINGS

The invention is described in greater detail below o with reference to the accompanying drawing, in which.

DESCRIPTION OF PREFERRED EMBODIMENTS

Figure 1:
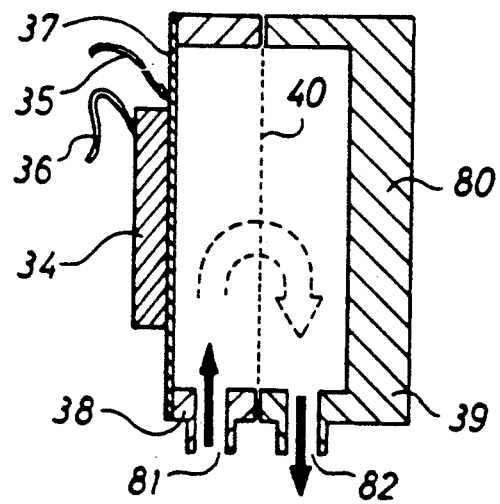
FIG. 1 illustrates a first embodiment of a filter according to the invention, FIG. 2 the pressure amplitude of the filter of FIG. 1, FIG. 3 a second embodiment of a filter according to the invention, FIG. 4 the pressure amplitude of the filter of FIG. 3, and FIG. 5 a third embodiment of a filter according to the invention.
Figure 2:
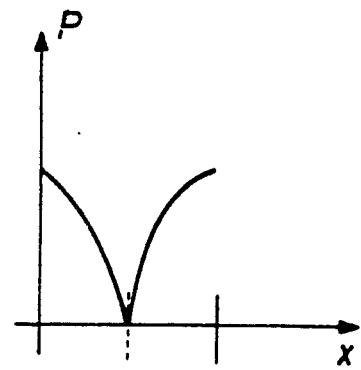

FIG. 1 illustrates a first embodiment of a filter according to the invention for filtration of a fluid, such as a photographic or reprographic developer. The filter comprises a filter cloth 40, typically a woven metal screen of a mesh size of 10 to 100 um. The filter comprises further a first filter housing part 38 and a second filter housing part 39, the filter cloth 40 being fixed between said parts. An ultrasonic transducer comprises a piezoelectric disk 34 glued onto a metal plate 37 which forms the end wall of the first filter housing part 38. The piezoelectric disk 34 is provided with connection lines 35 and 36. The end wall 80 of the second housing part 39 opposite the end wall 37 of the first housing part 38 comprises an ideal reflector. A fluid inlet 81 is provided in the bottom of the first housing part 38, and a fluid outlet 82 is provided in the bottom of the second housing part 39. The distance between the end wall 37 of the first housing part 38 and the end wall 80 of the second housing part corresponds to half a wave length of the sound propagation in the fluid to be filtered. The filter cloth 40 is arranged substantially corresponding to a quarter of a wave length from the end walls 37 and 80. Correspondingly, FIG. 2 shows the pressure amplitude in the filter when, in accordance with the above, a frequency is applied such that the distance from the transducer 34 and 37 to the reflector corresponds to half a wave length for the sound propagation in the fluid.

The transducer can either be continuously or periodically driven in response to the load of the filter, whereby the durability of the filter cloth is prolonged. From an ideal point of view, the ultrasound must be applied each time the drop in pressure across the filter has reached a predetermined limit. Tests have shown that the fluid flow through the filter drops approximately exponentially versus time at a constant pumping capacity. When the filter cloth is subjected to ultrasound, the fluid flow increases, however, again exponentially, but typically with a time constant two or three times lower than the time constant for clogging. Accordingly, it is only necessary to apply ultrasound during a very small percentage of the time.

As the generation of ultrasound is relatively expensive, it is advantageous to utilize the ultrasonic field to a maximum. As the dampening provided by a thin filter cloth is minimal even when it is arranged in a maximum for the particle velocity amplitude, the resonator can be extended such that its length corresponds to a higher number of half wave lengths. One or more filter cloths can be arranged in each maximum for the particle velocity amplitude, the spaces between the filter cloths alternately communicating with the inlet and outlet side, respectively, of the filter.

Figure 3:
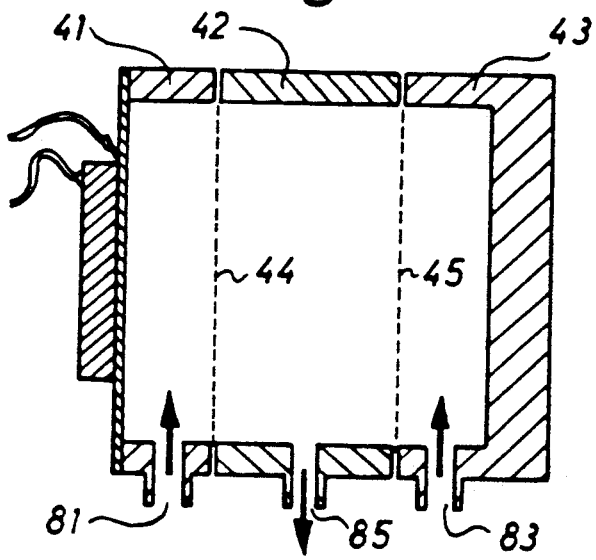
Figure 4:
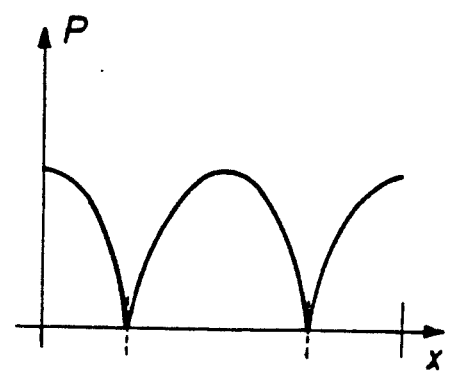

FIG. 3 illustrates an embodiment of a filter, where the resonator is of a length of a wave length, cf. FIG. 4 showing the pressure amplitude in the filter. The filter of FIG. 3 is in principle structured like the filter of FIG. 1, i.e. it comprises a first housing part 41 corresponding to the housing part 38 of FIG. 1, and a second housing part 43 corresponding to the housing part 39 of FIG. 1, except for the outlet 82 of FIG. 1 here being an inlet 83. An intermediary member 42 with an outlet 85 in the bottom is inserted between the two housing parts 41 and 43. A first filter cloth 44 corresponding to the filter cloth 40 of FIG. 1 is arranged between the first housing part 41 and the intermediary member 42. A second filter cloth 45 corresponding to the filter cloth 44 is arranged between the intermediary member 42 and the second housing part 43.

Figure 5:
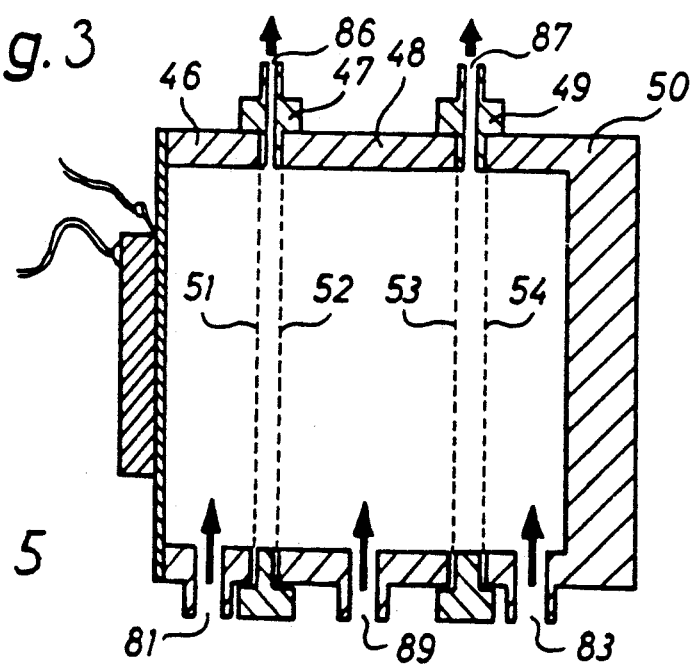

FIG. 5 illustrates a further embodiment of the filter according to the invention, this embodiment including several filter cloths. The length of the resonator of the filter of FIG. 5 corresponds to a wave length like the filter of FIG. 3. In the filter of FIG. 5, two filter cloths 51, 52; 53, 54 are arranged with a short mutual spacing at each minimum of the pressure amplitude. The filter comprises a first housing part 46 corresponding to the housing part 41 of FIG. 3, a second housing part corresponding to the housing part 43 of FIG. 3, and an intermediary member 48 corresponding to the intermediary member 42 of FIG. 3, except for the outlet 85 of FIG. 3 here being used as an inlet 89. The short distance between the filter cloth 51, 52 and 53, 54, respectively, is typically less than 1/10 of the wave length. The distance is provided by means of distance means 47 and 49 with openings 86, 87 for the discharge of fluid.

As described in connection with the filter of FIG. 1, the filter of FIGS. 3 and 5 can, of course, be both continuously and intermittently driven in response to the clogging of the filter cloth.

It should be noted, that although all the illustrated embodiments use a plane filter cloth, the resonator can be arranged both for a one-dimensional field and a radial field, in which case the filter cloth resembles a cylindrical shell.

Furthermore it should be noted that in connection with the application of the ultrasonic field, it can be advantageous to turn the flow through the filter in such a manner that a so-called back flush of the filter cloth is performed. The back flush can be performed such that the inlet side of the filter is emptied for impurities or particles loosened by the applied ultrasound by draining off the amount of fluid used for the back flush through a drain valve, said amount of fluid carrying the impurities.

In reprographic machines, the amount of impurities present in the fluids used, such as developer, fixing solution and rinsing fluid, is more or less proportional to the amount of photographic material treated in the machine. As a typical reprographic machine measures the area of treated photographic material and feeds fresh fluid proportional to the fluid consumed, the filter according to the invention is when used in such a reprographic machine preferably controlled such that the impurities are drained off just before a fresh dose of fluid is fed, these impurities, for instance, resulting from the above back flush. In this manner it is avoided that some of the fresh fluid is drained off in connection with the draining off.

I claim:
1. A filter for filtering a given fluid having a given velocity of sound propagation, comprising:
   wall means defining a housing having an internal chamber, at least one inlet to said chamber and at least one outlet from said chamber, so that a supply of said fluid may be flowed into and out of said chamber respectively through said inlet and said outlet;
   at least one filter cloth means arranged in said chamber so that said supply in flowing from said inlet to said outlet through said chamber must flow through said filter cloth means;
   a supply of said fluid flowing through said chamber from said inlet to said outlet;
   an acoustic field producing means coupled to said wall means and producing in said chamber a standing wave acoustic field having a given wavelength;
   each said at least one filter cloth means being disposed substantially at a respective pressure node or velocity antinode of said acoustic field.
2. The filter of claim 1, wherein:
   said at least one filter cloth means comprises at least two filter cloths disposed substantially at a respective two pressure nodes or velocity antinodes of said acoustic field.
3. The filter of claim 1, wherein:
   at least one said filter cloth means comprises tow layers of filter cloth both disposed substantially at a same respective pressure node or velocity antinode of said acoustic field, with a spacing, between each said layer of less than one-tenth of said wavelength.

* * * * *